US009698657B2

(12) United States Patent
Woodward

(10) Patent No.: US 9,698,657 B2
(45) Date of Patent: Jul. 4, 2017

(54) BLOWER MOTOR FOR HVAC SYSTEMS

(71) Applicant: Nidec Motor Corporation, St. Louis, MO (US)

(72) Inventor: Arthur E. Woodward, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 14/977,371

(22) Filed: Dec. 21, 2015

(65) Prior Publication Data
US 2016/0111943 A1   Apr. 21, 2016

Related U.S. Application Data

(60) Continuation of application No. 13/912,877, filed on Jun. 7, 2013, now Pat. No. 9,219,398, and a division of application No. 12/762,661, filed on Apr. 19, 2010, now Pat. No. 8,558,493.

(51) Int. Cl.
| H02P 1/04 | (2006.01) |
| H02K 15/00 | (2006.01) |
| F23N 3/08 | (2006.01) |
| F23N 5/24 | (2006.01) |
| H02P 6/08 | (2016.01) |

(52) U.S. Cl.
CPC ......... *H02K 15/0006* (2013.01); *F23N 3/082* (2013.01); *F23N 5/242* (2013.01); *H02P 6/08* (2013.01); *F23N 2031/04* (2013.01); *F23N 2031/10* (2013.01); *F23N 2033/08* (2013.01); Y10T 29/49009 (2015.01)

(58) Field of Classification Search
CPC ...... H02P 23/0036; H02P 1/44; H02P 27/045; H02P 27/14; H02P 6/181; F04D 29/588; H05K 13/00
USPC ....... 318/400.09, 400.3, 719, 801, 805, 807, 318/440, 442, 558
See application file for complete search history.

(56) References Cited

U.S. PATENT DOCUMENTS

| 4,384,461 A * | 5/1983 | Kurtz ................... G05D 23/275 377/20 |
| 7,268,505 B2 * | 9/2007 | Pant .......................... H02P 1/18 318/400.01 |
| 7,327,118 B2 * | 2/2008 | Pant .......................... H02P 1/18 318/756 |
| 8,049,459 B2 * | 11/2011 | Woodward ................ H02P 1/04 318/772 |
| 8,487,562 B2 * | 7/2013 | Solan, Jr. .................. H02P 6/06 318/400.11 |
| 8,766,573 B2 * | 7/2014 | Becerra .................. F24F 11/006 236/51 |

(Continued)

*Primary Examiner* — Bentsu Ro
*Assistant Examiner* — Thai Dinh
(74) *Attorney, Agent, or Firm* — Hovey Williams LLP

(57) ABSTRACT

A blower motor assembly having a variable speed motor that is suitable for replacing a PSC motor in a residential HVAC (heating, ventilation, and air conditioning) system. The blower motor assembly includes a variable speed motor and motor controller; a first power input for receiving a plurality of AC power signals from a control device for use in determining an operating parameter for the motor; and a second power input for receiving AC power from an AC power source for powering the motor controller even when no AC power signals are received by the first power input.

23 Claims, 5 Drawing Sheets

(56) References Cited

U.S. PATENT DOCUMENTS

| | | | |
|---|---|---|---|
| 8,928,262 B2* | 1/2015 | Chretien | H02P 21/05 |
| | | | 318/400.01 |
| 2008/0180048 A1* | 7/2008 | Mullin | H02P 6/34 |
| | | | 318/400.26 |
| 2009/0134823 A1* | 5/2009 | Jeung | F04D 27/004 |
| | | | 318/400.18 |
| 2013/0103206 A1* | 4/2013 | Becerra | F24F 11/006 |
| | | | 700/276 |

* cited by examiner

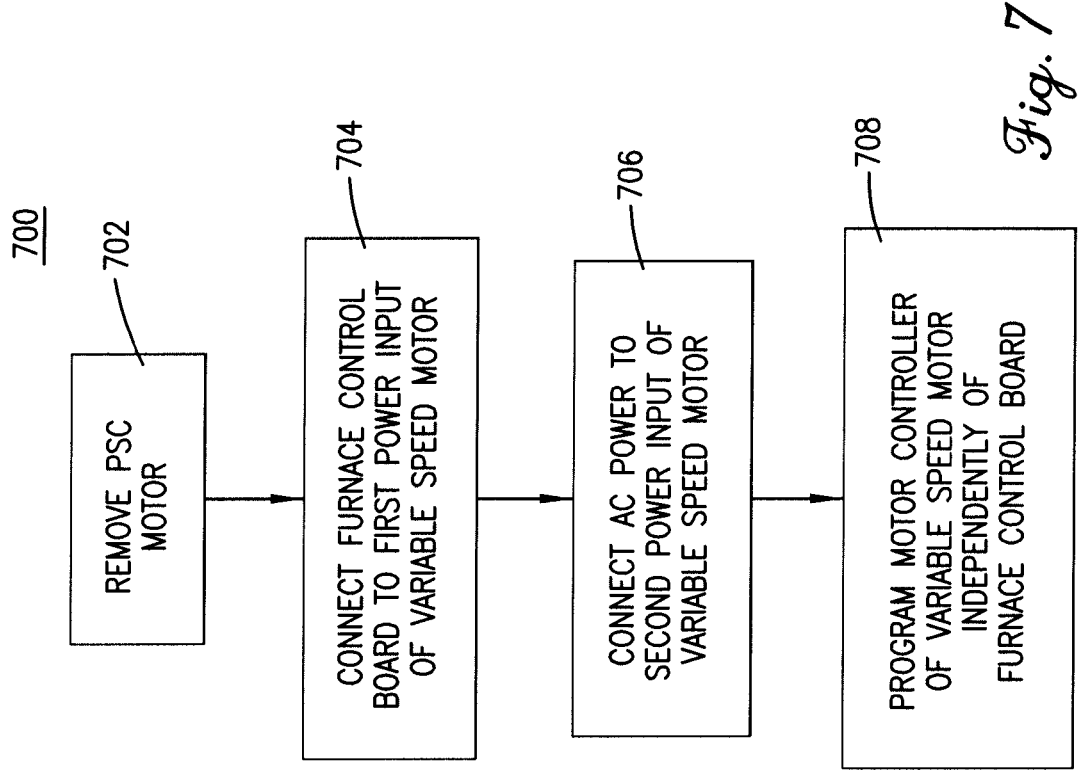

BLOWER MOTOR FOR HVAC SYSTEMS

RELATED APPLICATIONS

The current patent application is a continuation patent application of an earlier-filed non-provisional patent application titled "BLOWER MOTOR FOR HVAC SYSTEMS", with application Ser. No. 13/912,877, filed Jun. 7, 2013, which itself is a divisional patent application of an earlier-filed non-provisional patent application titled "BLOWER MOTOR FOR HVAC SYSTEMS", with application Ser. No. 12/762,661, filed Apr. 19, 2010. The current application claims priority benefit of both earlier-filed identified applications, and hereby incorporates the identified applications by reference in their entireties into the current application.

FIELD OF INVENTION

The present invention relates to blower motors and controls used in residential heating, ventilation, and air conditioning (HVAC) systems and other applications. More particularly, embodiments of the invention relate to a variable speed blower motor that may be used as a replacement for a permanent split capacitor (PSC) motor or in Original Equipment Manufacturer (OEM) applications and other applications.

BACKGROUND

HVAC system efficiency improvements have provided considerable reductions in energy use. For example, many high efficiency furnaces, air conditioners, and air handlers now have Annual Fuel Utilization Efficiency (AFUE) ratings greater than 90%. However, many blower motors used to move the air in these systems have not seen significant efficiency improvements and have much lower efficiencies. As furnaces and air conditioners have become more efficient, the fraction of total energy consumption attributed to blower motors has increased, thus making blower motors a greater contributor to overall HVAC system energy use.

Blower motor inefficiencies are magnified when a blower motor is operated for extended hours beyond that needed solely for heating and cooling. For example, some users choose to operate their blower motor continuously by setting a fan control switch to the "on" position. This circulation mode of operation reduces temperature stratification, minimizes start drafts from duct work, improves humidity control, and increases the effectiveness of associated air cleaners employed in conjunction with the HVAC system. By selecting the "on" position, the blower motor operates continuously, and the associated thermal feature, (i.e., either heating or cooling) operates on the "demand" setting of the thermostat. When in the "on" position, the blower motor typically operates at the speed used for cooling, even when the thermostat is set to heat mode. This speed is usually well in excess of what is necessary to achieve the air circulation benefits outlined above, causing excess energy usage and noise. In addition, with the blower switch in the "on" position, the system can no longer select a speed for cooling or heating and instead continuously runs at the continuous fan speed. Even when systems are designed to select the proper speed in a multiple speed motor, for example, as disclosed in U.S. Pat. No. 4,815,524, the speed available for blower "on" use is higher than necessary for such operations, and can be responsible for cold spot corrosion, requiring a shut down period disclosed in the '524 patent. The increased operation time also leads to greater energy use.

Many of the above-described inefficiencies result from the type of blower motor used in HVAC systems. HVAC systems traditionally use fixed speed or multiple speed permanent split capacitor (PSC) motors. These motors generally have two or more independent power connections to accommodate two or more heating or cooling modes of operation. The heating or cooling power inputs are normally connected to different winding taps in the PSC motor to provide somewhat different operating speeds for the blower in the respective modes of operation, allowing the OEM or installer to select the operating speed by appropriate connection of the taps to the respective heating and cooling power connections. The energizing of these AC power connections to the motor is controlled by activation of a temperature switch and a relay driven from the thermostat.

An example of a fixed speed PSC motor M used in residential HVAC systems is shown in FIG. 1 and generally identified as 10A. The illustrated motor has two winding taps to accommodate a heating fan speed and a cooling fan speed. The fan speed is controlled by a furnace control board which receives control signals from a thermostat or other control device. Another exemplary PSC motor M is shown in FIG. 2 and generally identified as 10B. This motor has four winding taps to accommodate two heating fan speeds and two cooling speeds. The fan speed is controlled by a furnace control board with a cool/heat relay, a low/high cool relay, and a low/high heat relay. As with the motor shown in FIG. 1, the furnace control board receives control signals from a thermostat or other control device. Other similar HVAC systems may include two heating stages and a single cooling stage or any other combination of heating and cooling speeds. The single phase AC supply voltage (normally 115 VAC or 230 VAC) for both the motors of FIGS. 1 and 2 is supplied by connections L1 and N, where L1 represents the hot side of the AC supply, and N is neutral, which is at earth potential in a typical 115 VAC residential distribution system. (In normal 230 VAC systems, another hot supply line would be substituted for the neutral line N.)

PSC motors such as those shown in FIGS. 1 and 2 are reasonably efficient when operated at high speed, but their efficiencies may drop down into the 20% range when operated at low speeds. Because air conditioner evaporator coils need higher airflow than furnace heat exchangers, the blower motor operates at a lower speed during furnace operation, where it is less efficient, and at an even lower speed still during continuous fan "on" operation, where it is least efficient.

Because of the above-described inefficiencies of PSC motors, many newer HVAC systems use variable speed motors such as brushless permanent magnet (BPM) motors and corresponding electronic variable speed motor controllers. The speed of a BPM can be electronically controlled and set specifically to match the airflow requirements for each application, thus permitting more efficient operation. Also, BPM motors use power approximately proportional to the cube of motor speed, whereas PSC motors use power approximately proportional to motor speed. Therefore, as motor speed drops, BPM motors use less power than PSC motors. This is particularly important when operating the blower continuously for circulation as described above.

While variable speed motors are often superior to PSC motors, replacing an existing PSC motor with a variable speed motor has required costly, time-consuming, and complex changes in the mechanical, wiring, or control configuration of the system. Variable speed motor systems configured for replacement of PSC motors in existing HVAC systems have been developed, but many have relatively complicated control and sensing systems. For example, some systems require the installation of a temperature sensor in the outlet ductwork of the HVAC system for controlling the speed of the motor based upon temperature. Other replacement systems require the connection of low voltage control signals directly from the thermostat to the motor. Making these connections can be cumbersome and difficult in an existing HVAC system. Moreover, these known systems lack the sensitivity to operate blowers at low operating speeds and do not benefit from the relays and control functions in existing furnace control boards.

Still other replacement systems use the control functions of existing furnace control boards but lack standby power when the furnace control board does not call for motor operation. This makes it impossible to program start and stop delays, ramp-down or ramp-up features, or other control features directly into the variable speed motor.

It would therefore be desirable to provide an improved HVAC replacement motor for a PSC motor to realize the advantages of a variable speed blower motor without requiring significant changes to the HVAC system. It would be further advantageous to reduce the complexity of such replacement systems by utilizing simple control circuits and eliminating the need for extensive additional wiring, such as that used in conjunction with traditional variable speed motors and existing replacement variable speed motor systems. It would also be advantageous to provide an HVAC blower motor that could be more easily customized with start and stop delays, motor ramp-up speeds, and/or motor ramp-down speeds.

SUMMARY

The present invention solves many of the above-described problems and other problems and provides a distinct advance in the art of HVAC blower motors and other electric motors.

One embodiment of the invention is a blower motor assembly broadly comprising a variable speed motor and motor controller; a first power input for receiving a plurality of AC power signals from a furnace control board or other control device; and a second power input for receiving AC power from an AC power source for powering the motor controller even when no AC power signals are received by the first power input.

The first power input may be used for determining an operating parameter for the motor and comprises a number of individual power connections, each associated with one of the speed taps of a PSC motor being replaced by the blower motor assembly of the present invention. For example, when the blower motor assembly of the present invention is designed to replace a two-speed/tap PSC motor, the first power input comprises two power connections, one associated with a cooling mode of operation and the other a heating mode of operation. A sensing circuit is coupled with the first power input to determine which of the individual power connections is energized by the furnace control board. This allows the motor controller to determine the appropriate speed of the motor based on existing control settings in the furnace control board.

The second power input, along with a neutral input, is connected to a rectifier for providing AC power to the rectifier and the motor and motor controller. The second power input may receive AC power from the line voltage applied to the input of the furnace control board or from any other source or supply of power. Because the second power input does not receive its power from the output of the furnace control board, it provides power to the motor and motor controller even when the furnace control board and its associated thermostat are not calling for heating, cooling, or any other blower motor operation. This "standby" power permits an installer or other person to test, program, or otherwise operate the motor independently of the furnace control board. For example, with standby power, an installer may program start and stop delays, start ramp-ups, and/or stop ramp-downs directly into the motor controller independently of the furnace control board.

By constructing a blower motor assembly as described herein, numerous advantages are realized. For example, the blower motor assembly of the present invention can be used as a relatively low-cost replacement for an inefficient fixed speed motor in an existing HVAC system. The replacement blower motor assembly uses less energy, allows for economical continuous fan operation, and is quieter than conventional fixed speed motors. Moreover, the blower motor assembly can be quickly and easily installed without requiring extensive changes to the mechanical configurations, wiring, or control of the HVAC system.

By using the speed/tap power signals from an existing furnace control board for control purposes, the blower motor assembly benefits from the existing speed control relays and settings for an HVAC system. This allows the blower motor assembly to utilize any start and stop delays already programmed into the furnace control board. Moreover, by inclusion of a second power input for receiving power for the motor and motor controller independently of the furnace control board, an installer or other person may test, program, or otherwise operate the motor even when the furnace control board does not call for motor operation. This allows an installer to provide additional start and stop delays and ramp-up and ramp-down cycles beyond those already programmed into the furnace control board.

The blower motor assembly of the present invention may also be used in OEM and other non-replacement applications. Moreover, many aspects of the present invention may be separately useful without the motor, both for OEM and/or replacement use.

These and other important aspects of the present invention are described more fully in the detailed description below.

BRIEF DESCRIPTION OF THE DRAWING FIGURES

Embodiments of the current invention are described in detail below with reference to the attached drawing figures, wherein:

FIG. 6 is a truth table representing a logic function of the motor controller for the sensing circuit of FIG. 5.

FIG. 7 is a flow diagram depicting a method of replacing a fixed speed motor with a variable speed blower motor assembly such as the one shown in FIG. 3.

Figure 1:
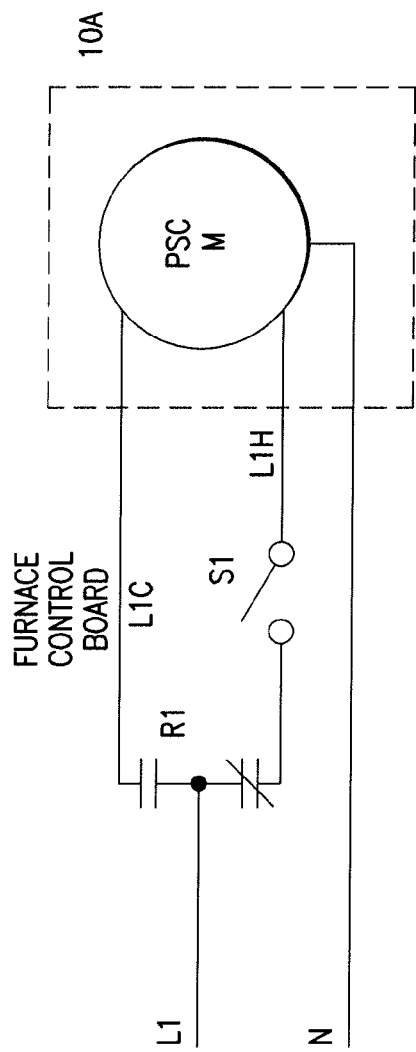
FIG. 1 is a schematic circuit diagram of a prior art blower motor and associated control circuitry for an HVAC system.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 3:
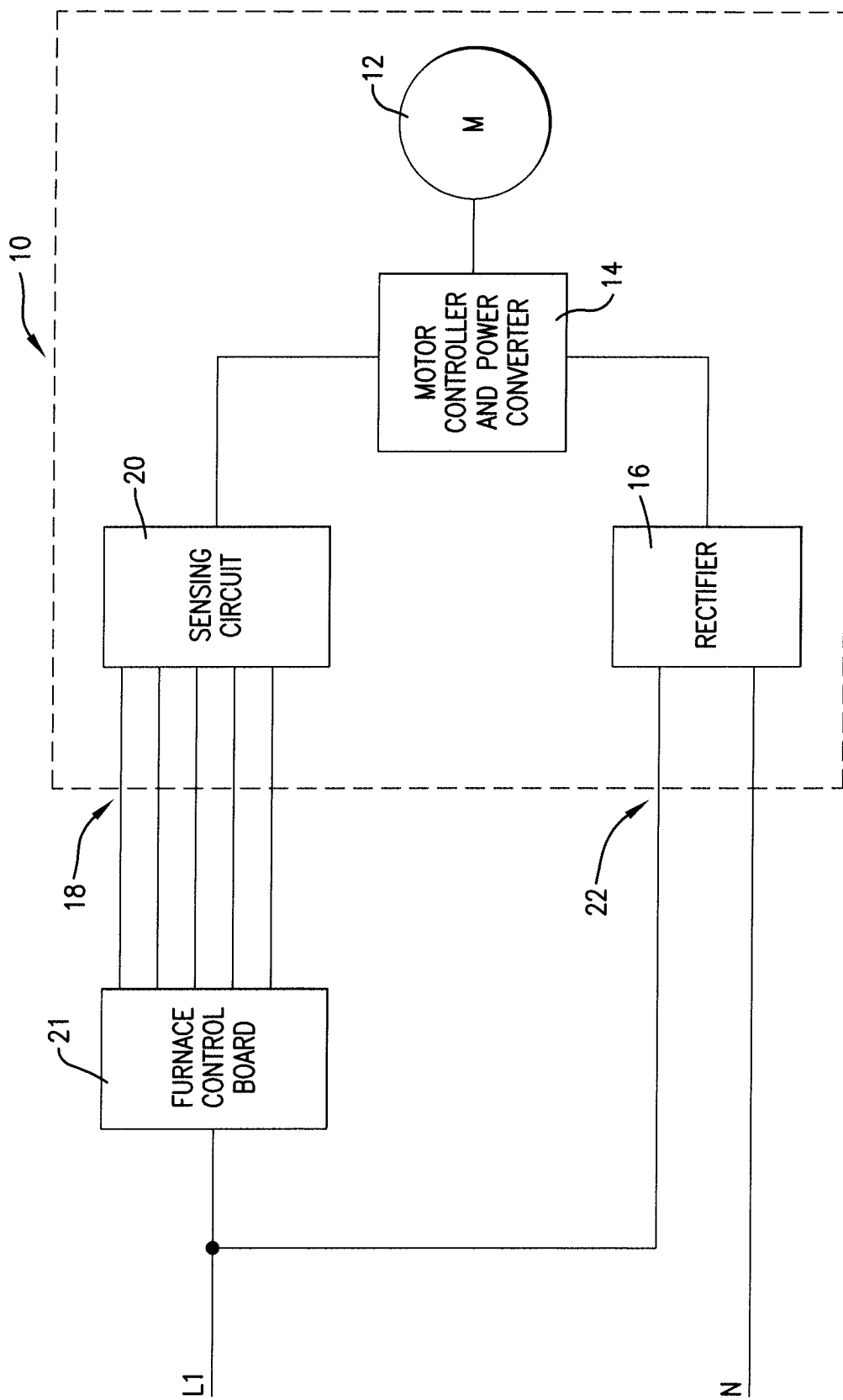
FIG. 3 is a schematic circuit diagram of a blower motor assembly constructed in accordance with an embodiment of the invention and shown wired to associated control circuitry and power connections of an HVAC system.

Referring to FIG. 3, a blower motor assembly 10 constructed in accordance with an embodiment of the invention is shown. The illustrated blower motor assembly 10 broadly comprises a variable speed motor 12, the motor's associated motor controller and power converter 14, a rectifier 16, a first power input 18, a sensing circuit 20, and a second power input 22. The components of the blower motor assembly 10 may be installed or contained in a conventional motor housing or "can" or in any other enclosure.

As described in more detail below, the first power input 18 has several individual power connections for receiving speed/tap selection power signals from a furnace control board 21 or other control device. These power signals are used by the blower motor assembly 10 for control purposes to determine the appropriate speed of the motor 12. Advantageously, this provides motor speed selection, motor start and stop delays, and other control functions for the blower motor assembly 10 based on existing control settings in the furnace control board 21. The second power input 22, along with a neutral input, is connected to the rectifier 16 for providing AC power to the rectifier 16 and the motor 12 and motor controller 14 independently of the furnace control board 21. The second power input 22 provides power to the motor 12 and motor controller 14 even when the furnace control board 21 and its associated thermostat are not calling for heating, cooling, or any other blower motor operation. This "standby" power permits an installer or other person to test, program, or otherwise operate the motor 12 independently of the furnace control board 21. For example, with standby power, start and stop delays, start ramp-ups, and stop ramp-downs may be programmed directly into the motor controller 14 independently of the furnace control board 21.

Figure 2:
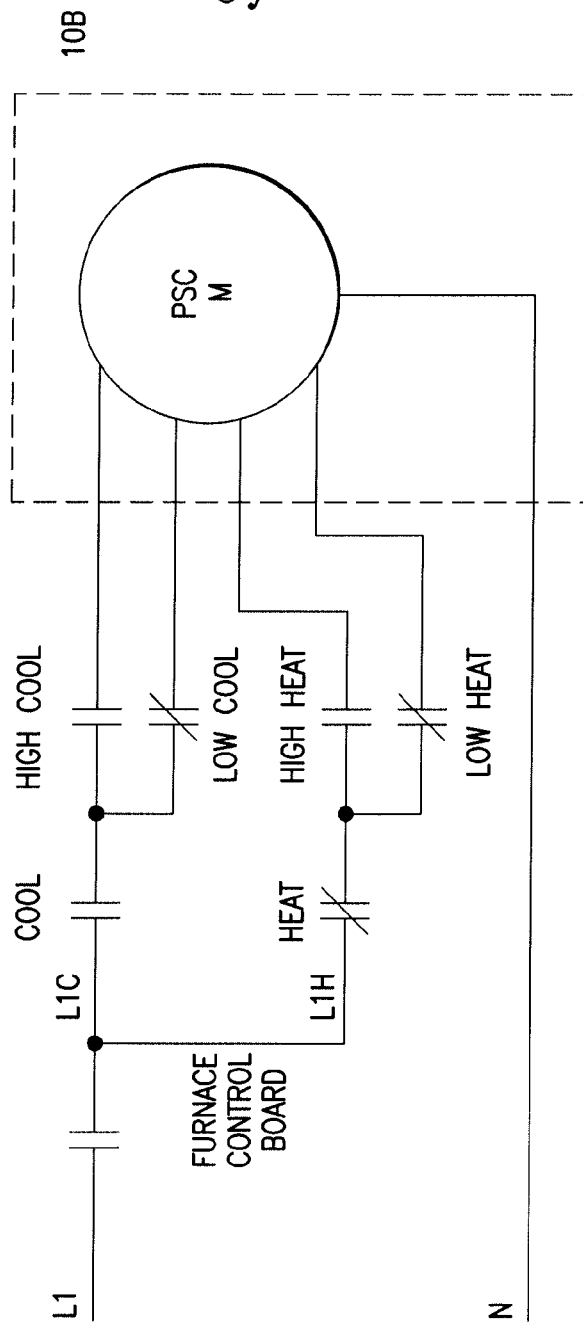
FIG. 2 is a schematic circuit diagram of another prior art blower motor and associated control circuitry for an HVAC system.

The blower motor assembly 10 can serve as a drop-in replacement, with the provision of an extra line voltage power connection at the second power input 22, for that portion of the PSC motors of FIGS. 1 and 2 enclosed by the rectangles 10A and 10B. The blower motor assembly 10 can also be used in OEM and other non-replacement applications. Moreover, many aspects of the present invention may be separately useful without the motor 12 and motor controller 14, both for OEM and/or replacement use.

The motor 12 and motor controller 14 may be any conventional variable speed motor and controller suitable for use in HVAC blower assemblies and other applications. For example, the motor may be a high efficiency permanent magnet type motor between ⅓-1 HP and may be rated 115 or 230 volt.

Figure 4:
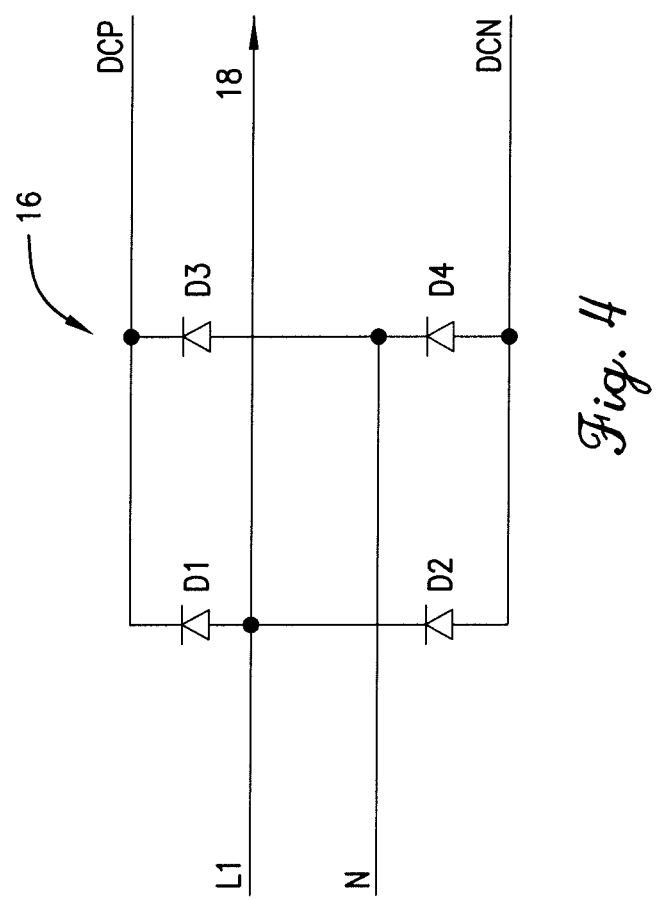
FIG. 4 is a schematic circuit diagram of an exemplary rectifier of the blower motor assembly shown in FIG. 3.

The rectifier 16 converts the AC power on the second power input 22 and neutral connection N to DC power and delivers the DC power to the motor controller 14. An embodiment of the rectifier 16 is shown in FIG. 4 and includes a rectifier bridge comprising diodes D1, D2, D3, and D4.

The first power input 18 comprises a number of individual power connections for receiving 115V or 230V AC power signals from the furnace control board 21 or other control device. The power connections may comprise conventional electrical plugs, terminals, sockets, conductors or any other device or mechanism capable of connecting to a wire, cable, or other electrical conductor. Each of the received power signals may be associated with one of the speed taps of a PSC motor being replaced by the blower motor assembly 10 of the present invention.

For example, when the blower motor assembly 10 is designed to replace a two-speed/tap PSC motor (such as the one shown in FIG. 1), the first power input 18 comprises two power connections, one for receiving a power signal (L1C) from the furnace control board 21 associated with a cooling mode of operation and the other for receiving a power signal (L1H) from the furnace control board associated with a heating mode of operation. Similarly, when the blower motor assembly 10 is designed to replace a four-speed/tap PSC motor (such as the one shown in FIG. 2), the first power input 18 comprises four power connections for receiving four power signals from the furnace control board 21 associated with high cool, low cool, high heat, and low heat modes of operation. In yet another embodiment, the first power input 18 may have five power connections for receiving five different power signals corresponding to a highest blower speed, a medium-high blower speed, a medium blower speed, a medium-low blower speed, and a low blower speed. Still other embodiments of the first power input may have other numbers of power connections. However, in all the embodiments, the first power input 18 is configured for receiving 115V, 230V, or other power signals from the furnace control board 21 or other control device. Some component values will be different for 230 volts.

Figure 5:
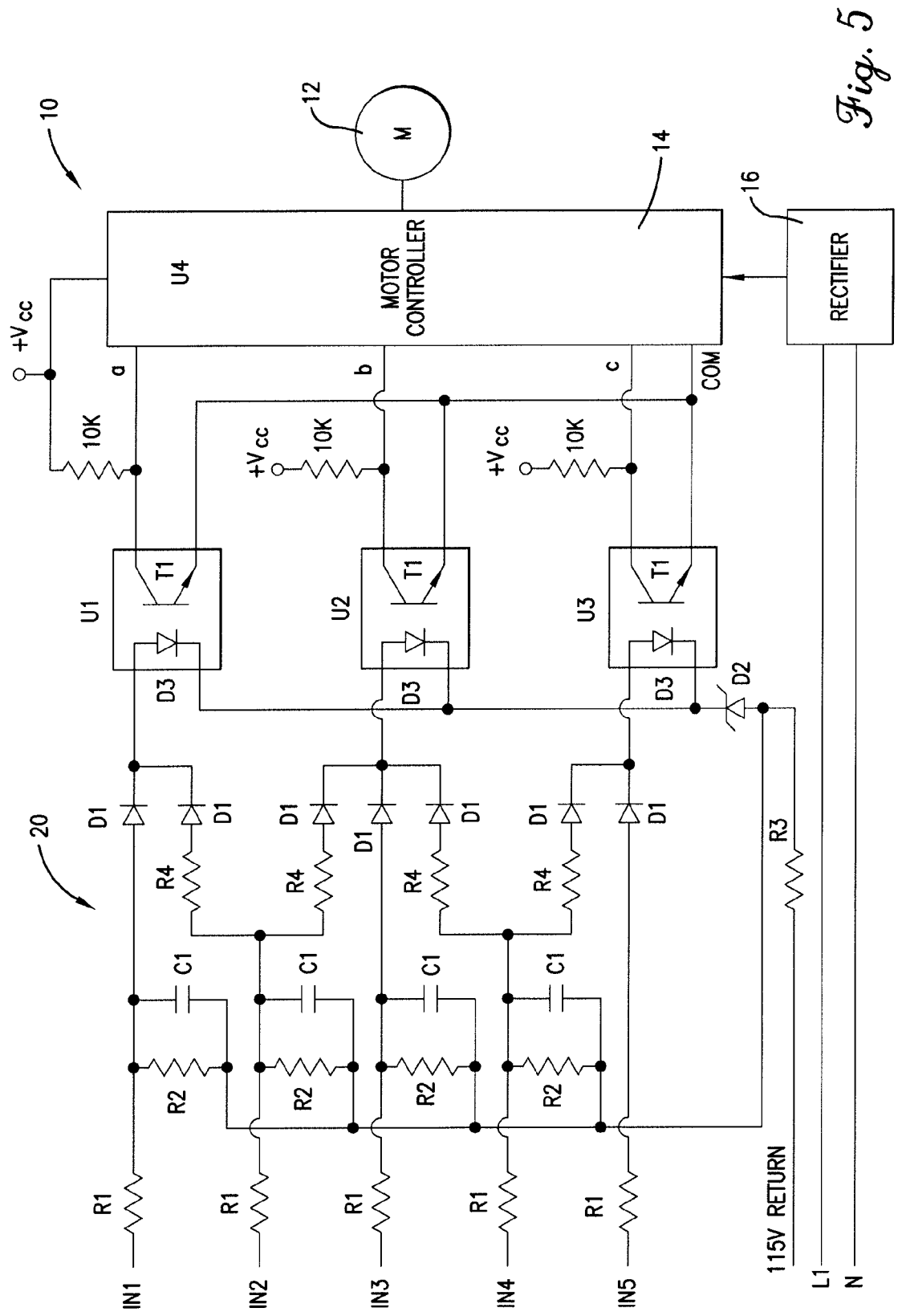
FIG. 5 is a schematic circuit diagram of the blower motor assembly of FIG. 3 showing an embodiment of the sensing circuit in more detail.

FIG. 5 illustrates an embodiment of the sensing circuit 20 for a blower motor assembly 10 configured to replace a five-speed/tap PSC motor. The exemplary blower motor assembly of FIG. 5 includes a first power input 18b with five power connections IN1-IN5 and three opto coupler circuits, generally indicated as U1, U2, and U3, for sensing voltage/current in the inputs IN1-IN5 and for providing associated signaling to the motor controller 14 for determining a corresponding fan speed or other motor parameter. The output signals from U1, U2, and U3 are indicated as a, b, and c. The sensing circuit 20 uses opto couplers to isolate the high input power voltage signals from the first power input 18 from the logic common and the motor controller 14 that interprets the signals coming out of the opto couplers.

The sensing circuit 20 also includes a voltage divider network for each of the five input circuit taps. Each voltage divider network has a resistor R1, a resistor R2, and a shared resistor R3. In one embodiment, each R1 may be 1.5K ohm, each R2 may be 5.6K ohm, and R3 may be 6.2K ohm. Each R2 resistor has a capacitor C1 (may be 0.022 uf) across it for noise reduction. Each R2-C1 network is shunted for the positive half cycle of the line by a diode D1, a Zener D2, and the input LED D3 of an opto coupler U1, U2, or U3. As the positive half cycle of each line increases to a peak value, current will flow through the input LED D3 of its opto coupler, causing an output transistor T1 to turn on and pull down the a, b, or c input to the motor controller 14. Input circuits IN2 and IN4 have to drive two opto inputs and have current sharing resistors R4 (may be 510 ohm) to assure that both optos get equal input current to be sure they both turn on.

The motor controller 14 detects the a, b, or c inputs being pulled low for parts of each line cycle to determine that the input is active rather than inactive. For inactive, the input is stuck at the +Vcc voltage for the motor controller 14, which is typically 3.3 or 5 volts dc.

The motor controller 14 then evaluates which inputs a, b, and/or c are active to decide at which speed or torque value to run the motor 12. As soon as it sees an input go active, it will start the motor 12 and ramp it to that operating speed or torque value saved in the motor controller 14 for that input. When the inputs change, the motor controller 14 will ramp to the new operating speed. If all of the inputs go to an inactive condition, the motor controller 14 will ramp the motor 12 down to a low speed and stop the motor. If a delay on stopping is called for, the motor controller 14 will continue to operate until the stop delay has timed out and then ramps down and stops.

The power inputs IN1-IN5 may correspond to any set of operating parameters for the motor 12. In one exemplary embodiment, IN1 may correspond to a highest blower speed (e.g. 100% speed), IN2 may correspond to a medium/high blower speed (e.g. 90% speed), IN3 may correspond to a medium blower speed (e.g. 80% speed), IN4 may correspond to a medium/low blower speed (e.g. 70% speed), and IN5 may correspond to a low blower speed (e.g. 60% speed).

As described above, the motor controller 14 receives signals a, b, and c from the sensing circuit 20 and determines a motor speed or other motor parameter based on a combination of the signals. FIG. 6 shows an exemplary truth table that may be utilized by the motor controller 14 to determine a motor operating speed or other motor parameter based on the sensing of current in IN1-IN5. The first line of the truth table shows that none of the opto couplers U1, U2, or U3 sensed current/voltage ("X" denotes sensing of current/voltage) in any of the power inputs so the motor should be stopped. The second line of the truth table shows that opto coupler U1 sensed current/voltage but opto couplers U2 and U3 did not. This indicates that only power input IN1 was energized because if any of IN2-IN5 inputs were also energized, opto couplers U2 or U3 also would have sensed current/voltage. The motor controller 14 therefore determines that a motor speed or other motor parameter (e.g., torque, power, airflow) associated with input IN1 is appropriate. For example, if input IN1 corresponds to the highest speed tap of the replaced PSC motor M1, the motor controller 14 may operate the variable speed motor 12 at a maximum speed.

The third line of the truth table shows that opto couplers U1 and U2 both sensed current/voltage but opto coupler U3 did not. This indicates that power input IN2 was energized because it is the only power input sensed by both opto couplers U1 and U2. The motor controller 14 therefore determines a motor speed or other parameter associated with IN2. The fourth line of the truth table shows that only opto coupler U2 sensed current/voltage, thus indicating that power input IN3 was energized because only IN3 is monitored solely by opto coupler U2 alone. The motor controller 14 therefore determines a motor speed or other motor parameter associated with IN3. The fifth line of the truth table shows that opto couplers U2 and U3 sensed current/voltage, thus indicating that power input IN4 was energized because only it is sensed by both these opto couplers. The motor controller 14 therefore determines a motor speed or other motor parameter associated with IN4. The sixth line of the truth table shows that only opto coupler U3 sensed current/voltage, thus indicating that power input IN5 was energized, because IN5 is the only power input sensed solely by this opto coupler alone. The motor controller 14b therefore determines a motor speed or other motor parameter associated with IN5.

Returning to FIG. 3, the second power input 22, along with a neutral input is connected to the rectifier 16 for providing AC power to the rectifier 16, the motor 12, and motor controller 14. The second power input 22 may comprise any conventional electrical plug, terminal, socket, conductor, or other device or mechanism capable of connecting to a wire, cable, or other conductor. The second power input may receive AC power from the L1 connection to the furnace control board 21 as illustrated in FIG. 3 or from any other source or supply of live voltage. Because the second power input 22 does not receive its power from the output of the furnace control board 21, it provides power to the motor 12 and motor controller 14 even when the furnace control board 21 and its associated thermostat are not calling for heating, cooling, or any other blower motor operation. This "standby" power permits an installer or other person to test, program, or otherwise operate the motor 12 independently of the furnace control board 21. For example, with standby power, start and stop delays, start ramp-ups and stop ramp-downs may be programmed directly into the motor controller independently of the furnace control board. Because the controller has a standby mode, it is possible for the motor to continue running after the input signals have gone away for delay times such as 30, 60, or 90 seconds, that would allow the system to extract the remaining heating or cooling from the heat exchanger before stopping the motor. These are typical delay times in these applications.

FIG. 7 illustrates a method 700 of replacing a fixed speed motor with a variable speed motor assembly such as the blower motor assembly 10 shown in FIG. 3. The method first comprises the step of removing the permanent split capacitor motor as shown in step 702 of FIG. 7. This may be done in any conventional manner. The installer then installs the replacement motor assembly by first connecting speed/tap selection wires from the furnace control board 21 or other control device to the first power input 18 on the variable speed motor as depicted in step 704. As mentioned above, these power connections from the furnace control board 21 are used for control purposes to determine a speed setting of the variable speed motor. The installer then connects an AC power line to the second power input 22 on the variable speed motor as depicted in step 706 for powering the variable speed motor independently of the furnace control board 21. The installer may then program speed characteristics directly into a motor controller 14 of the variable speed motor 12 independently of any speed settings provided by the furnace control board 21 as depicted in step 708. The speed characteristics may comprise start delays, stop delays, start ramp-ups, or stop ramp-downs.

Although the invention has been described with reference to the embodiments illustrated in the attached drawing figures, it is noted that equivalents may be employed and substitutions made herein without departing from the scope of the invention as recited in the claims. For example, while the invention has been described in connection with 115 VAC distribution systems, it is not limited to 115 VAC distribution systems. One skilled in the art will recognize that, with obvious modifications of implementation details, the invention may be adapted to other power distribution systems and voltages in use in the United States and elsewhere, including, but not limited to, 230 VAC distribution systems. Further, although many aspects of the present invention are particularly applicable to HVAC blower motors, they may also be used with electric motors designed for other applications. Moreover, all of the above-described embodiments of the invention are independent of motor technology, and induction, brushless permanent magnet, switched reluctance, brushed DC, and other types of motors may be used. The invention is also compatible with a variety of converter topologies, both for AC to DC and AC to AC conversion, including phase control using a thyristor full converter or semiconverter. Related technologies are also disclosed in U.S. Pat. No. 5,818,194, which is hereby incorporated by reference in its entirety.

Having thus described the exemplary embodiment of the invention, what is claimed as new and desired to be protected by Letters Patent includes the following:

1. A method of replacing a permanent split capacitor motor with a variable speed motor assembly including a variable speed motor, the method comprising:
    removing the permanent spot capacitor motor:
    connecting speed/tap selection wires from a furnace control board to a sensing circuit of the variable speed motor assembly; and
    connecting an AC power line to a rectifier circuit of the variable speed motor assembly for powering the variable speed motor independently of the furnace control board, wherein the furnace board includes five speed/tap selection wires and the sensing circuit includes five inputs to which the speed/tap selection wires are connected.

2. The method of claim 1, wherein the speed/tap selection wires are used for determining a speed setting of the variable speed motor.

3. The method of claim 2, further comprising:
    programming speed characteristics directly into a motor controller of the variable speed motor independently of any speed settings provided by the furnace control board.

4. The method of claim 2, further comprising:
    programming start delays directly into a motor controller of the variable speed motor independently of any speed settings provided by the furnace control board.

5. The method of claim 2, further comprising:
    programming stop delays directly into a motor controller of the variable speed motor independently of any speed settings provided by the furnace control board.

6. The method of claim 2, further comprising:
    programming start ramp-ups directly into a motor controller of the variable speed motor independently of any speed settings provided by the furnace control board.

7. The method of claim 2, further comprising:
    programming stop ramp-downs directly into a motor controller of the variable speed motor independently of any speed settings provided by the furnace control board.

8. The method of claim 1, wherein the variable speed motor assembly includes a motor controller configured to determine a speed or torque value to provide to the variable speed motor, the speed or torque value varying according to an output of the sensing circuit.

9. The method of claim 8, wherein
    the sensing circuit includes three outputs,
    the motor controller includes three inputs to which the three outputs of the sensing circuit are connected, and
    the sensing circuit is configured to set electrical values of the three outputs according to electrical values of the speed/tap selection wires from the furnace board.

10. A method of replacing a permanent split capacitor motor with a variable speed motor, the method comprising:
    removing the permanent split capacitor motor:
    connecting five speed/tap selection wires from a furnace control board to five inputs of a sensing circuit of the variable speed motor assembly; and
    connecting an AC power line to a rectifier circuit of the variable speed motor assembly for powering the variable speed motor independently of the furnace control board.

11. The method of claim 10, wherein the speed/tap selection wires are used for determining a speed setting of the variable speed motor.

12. The method of claim 11, further comprising:
    programming speed characteristics directly into a motor controller of the variable speed motor independently of any speed settings provided by the furnace control board.

13. The method of claim 11, further comprising:
    programming start delays directly into a motor controller of the variable speed motor independently of any speed settings provided by the furnace control board.

14. The method of claim 11 further comprising:
    programming stop delays directly into a motor controller of the variable speed motor independently of any speed settings provided by the furnace control board.

15. The method of claim 11, further comprising:
    programming start ramp-ups directly into a motor controller of the variable speed motor independently of any speed settings provided by the furnace control board.

16. The method of claim 11, further comprising:
    programming stop ramp-downs directly into a motor controller of the variable speed motor independently of any speed settings provided by the furnace control board.

17. A method of replacing a permanent split capacitor motor with a variable speed motor, the method comprising:
    removing the permanent split capacitor motor;
    connecting speed/tap selection wires from a furnace control board to a sensing circuit of the variable speed motor assembly, wherein the speed/tap selection wires are used for determining a speed setting of the variable speed motor;

connecting an AC power line to a rectifier circuit of the variable speed motor assembly for powering the variable speed motor independently of the furnace control board; and programming start delays, stop delays, start ramp-ups, or stop ramp-downs directly into a motor controller of the variable speed motor independently of any speed settings provided by the furnace control board.

18. The method of claim 17, wherein the variable speed motor assembly includes a motor controller configured to determine a speed or torque value to provide to the variable speed motor, the speed or torque value varying according to an output of the sensing circuit.

19. The method of claim 18, wherein
the sensing circuit includes three outputs,
the motor controller includes three inputs to which the three outputs of the sensing circuit are connected, and
the sensing circuit is configured to set electrical values of the three outputs according to electrical values of the speed/tap selection wires from the furnace board.

20. A method of replacing a permanent split capacitor motor with a variable speed motor assembly including a variable speed motor, the method comprising:
removing the permanent split capacitor motor;
connecting speed/tap selection wires from a furnace control board to a sensing circuit of the variable speed motor assembly, wherein the speed/tap selection wires are used for determining a speed setting of the variable speed motor;
connecting an AC power line to a rectifier circuit of the variable speed motor assembly for powering the variable speed motor independently of the furnace control board; and
programming start delays directly into a motor controller of the variable speed motor independently of any speed settings provided by the furnace control board.

21. A method of replacing a permanent spilt capacitor motor with a variable speed motor assembly including a variable speed motor, the method comprising:
removing the permanent split capacitor motor;
connecting speed/tap selection wires from a furnace control board to a sensing circuit of the variable speed motor assembly, wherein the speed/tap selection wires are used for determining a speed setting of the variable speed motor;
connecting an AC power line to a rectifier circuit of the variable speed motor assembly for powering the variable speed motor independently of the furnace control board; and
programming stop delays directly into a motor controller of the variable speed motor independently of any speed settings provided by the furnace control board.

22. A method of replacing a permanent split capacitor motor with a variable speed motor as-sembly including a variable speed motor, the method comprising:
removing the permanent split capacitor motor;
connecting speed/tap selection wires from a furnace control board to a sensing circuit of the variable speed motor assembly, wherein the speeditap selection wires are used for determining a speed setting of the variable speed motor;
connecting an AC power line to a rectifier circuit of the variable speed motor assembly for powering the variable speed motor independently of the furnace control board; and
programming start ramp-ups directly into a motor controller of the variable speed motor independently of any speed settings provided by the furnace control board.

23. A method of replacing a permanent split capacitor motor with a variable speed motor assembly including a variable speed motor, the method comprising:
removing the permanent spot capacitor motor;
connecting speed/tap selection wires from a furnace control board to a sensing circuit of the variable speed motor assembly, wherein the speed/tap selection wires are used for determining a speed setting of the variable speed motor;
connecting an AC power line to a rectifier circuit of the variable speed motor assembly for powering the variable speed motor independently of the furnace control board; and
programming stop ramp-downs directly into a motor controller of the variable speed motor independently of any speed settings provided by the furnace control board.

* * * * *

UNITED STATES PATENT AND TRADEMARK OFFICE
CERTIFICATE OF CORRECTION

PATENT NO. : 9,698,657 B2  
APPLICATION NO. : 14/977371  
DATED : July 4, 2017  
INVENTOR(S) : Arthur E. Woodward It is certified that error appears in the above-identified patent and that said Letters Patent is hereby corrected as shown below:

In the Claims

In Claims 1 (Column 9, Line 41) and 23 (Column 12, Line 30), the word "spot" should be "split".

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*